April 26, 1960 G. E. FRANCK 2,934,362
TUBE CONNECTOR HAVING TORQUE RESISTING MEANS
Filed March 27, 1956
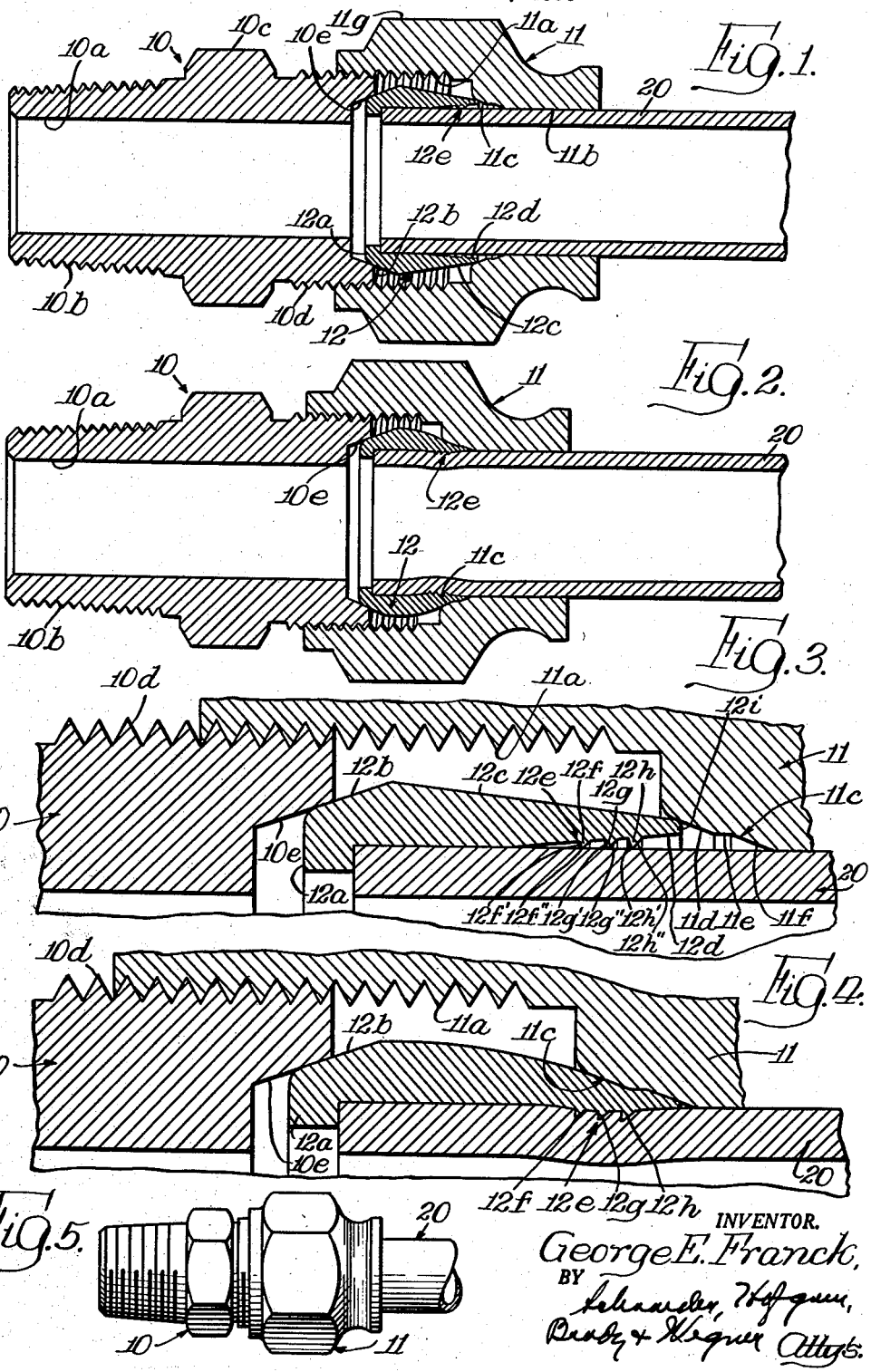
INVENTOR.
George E. Franck, United States Patent Office 2,934,362
Patented Apr. 26, 1960

2,934,362

TUBE CONNECTOR HAVING TORQUE RESISTING MEANS

George E. Franck, Riverside, Ill., assignor to The Imperial Brass Manufacturing Company, a corporation of Illinois Application March 27, 1956, Serial No. 574,277

7 Claims. (Cl. 285—341)

This invention relates to a tube fitting and in particular to a fitting for making a connection of a straight ended tube to an element.

The fittings presently known in the art for making connections of non-flared or straight ended tubes possess certain serious disadvantages. One such disadvantage is that a connection cannot be made unless the tube is sprung or moved longitudinally during the making of the joint. Where the tube to be connected is of a large diameter, rigid wall type or where the tube run is short and positively fixed, such springing or movement cannot be properly obtained. Another serious disadvantage in such tube fittings is the inability thereof to provide a proper seal with tubes having irregularities in the surface thereof. Still another disadvantage is that such tube fittings are relatively complicated of construction, utilizing a substantial plurality of separate parts, and therefor relatively costly of manufacture.

The principal object of this invention is to provide a new and improved tube fitting for connecting a straight ended tube to an element, which is adaptable for use with both hard and soft tubes.

Another object is to provide such a tube fitting wherein a "hit home" condition is obtained affording protection against excessive tightening of the fitting, yet assuring a positive seal between the fitting and the tube.

A further object is to provide such a tube fitting having a minimum number of elements to effect simplicity and economy and with the elements arranged to preclude inadvertent improper assembly.

Still another object of the invention is to provide such a tube fitting wherein a variation in the spacing between the tube end and the element may be accommodated while yet assuring a proper seal between the tube and the fitting and without requiring the longitudinal movement of the tube.

A still further object is to provide such a tube fitting wherein an annular biting rib is provided which is arranged to dig into the surface of the tube to effect a positive sealing securing of the tube to the fitting, with the penetration of the rib into the tube being substantially only radially, thereby preventing undesirable longitudinal gouging and tube material pile-up when the tube is fixed against longitudinal movement or necessitating movement of the tube longitudinally.

Yet another object is to provide such a tube fitting having only three elements, namely, a body member, a nut member, and a sleeve, with the elements being co-operatively arranged so that rotation of the sleeve is effectively prevented during the tightening operation, thereby precluding scoring of the tube by the biting element carried by the sleeve.

A yet further object of the invention is to provide a new and improved biting rib structure in such a tube fitting, comprising a plurality of sharp, radially inwardly projecting annular ribs arranged to move longitudinally along the tube during the development of sealing pressure between the sleeve and the body member and to dig radially into the tube subsequent thereto to seal the sleeve to the tube notwithstanding a substantial irregularity in the surface of the tube.

Still another object is to provide a fitting having ribs which are arranged to be turned under when in assembled relationship with the tube positively to prevent movement of the sleeve relative to the tube and assure maintained, positive sealing engagement therebetween.

A still further object is to provide such a tube fitting wherein mating frusto-conical surfaces of the sleeve and nut member co-act to cause longitudinally inner ribs to be effective in the connection of soft tubing and the longitudinally outer ribs to be effective in the connection of hard tubing.

Other features and advantages will be apparent from the following description taken in connection with the accompanying drawings wherein:

Figure 1 is a diametrical sectional view of a tube fitting embodying the invention and with a tube end received therein for connection;

Figure 2 is a sectional view similar to that of Figure 1 but with the elements arranged as upon completion of the connecting operations;

Figure 3 is an enlarged fragmentary sectional view of the elements as seen in Figure 1;

Figure 4 is an enlarged fragmentary sectional view of the elements as seen in Figure 2; and Figure 5 is a side elevational view of the tube fitting, with an end portion of a tube connected thereto.

In the exemplary embodiment of the invention as disclosed in the drawings, the tube fitting is seen to comprise three co-axially disposed elements, namely a body member 10, a nut member 11 and a sleeve 12. Body 10, which is arranged to be secured to an element (not shown) in fluid conductive relationship therewith, is adapted to have co-action with nut 11 whereby a bearing portion of the nut may be forcibly urged toward the body. Interposed between the bearing portion and the body is sleeve 12 to have, resultingly, sealed engagement with the body. Sleeve 12 is further adapted to receive the tube end 20 to be connected, and by concurrent co-action between the nut bearing portion and a constrictable portion of the sleeve, be constricted into tight sealing engagement with the tube. To insure a proper and positive sealed connection, the members are specifically constructed so that rotation of sleeve 12 by the rotational action of nut 11 is effectively precluded. Further, the actual digging in of the constrictable portion of the sleeve is allowed to occur only subsequently to the longitudinal positioning of the sleeve in sealing engagement with the body member, thereby assuring desirable limitation of the biting action to substantially a radial direction only.

Body 10 is generally tubular and is provided with a bore 10a extending from end to end thereof. Suitable means are provided at the outer end of body 10 for the connection thereof to any desired element (not shown) and, as shown, may comprise at exteriorly threaded portion 10b. To provide proper co-action with an installation tool, such as a wrench, body 10 may be further provided with a plurality of tool engaging surfaces 10c. The inner end portion of body 10 is exteriorly threaded at 10d and is provided with an inwardly opening annular recess, concentric of bore 10a and having a frust-conical seating surface 10e.

Nut 11 is generally tubular and is provided with a stepped bore extending from end to end thereof having an inner, threaded portion 11a and an outer portion 11b, with a novel, flared bearing surface 11c extending between portions 11a and 11b. Exterior tool engaging surface 11g may be provided as desired.

Sleeve 12 is generally tubular and is preferably formed of a material capable of being homogeneously hardened such as free cutting, low carbon steel. The internal diameter of sleeve 12 is preferably comparable to the external diameter of tube 20 so that only a slight clearance therebetween is had. At its inner end, sleeve 12 may be provided with a radially inwardly extending flange 12a and is provided with a radially outer frusto-conical surface 12b complementary to seating surface 10e. The longitudinally outer end of sleeve 12 is provided with a radially outer frusto-conical surface 12c arranged for co-action with nut bearing surface 11c and angularly correlated with surface 12b as disclosed below. From a point approximately midway between its ends, the sleeve is provided interiorly with an outwardly opening frusto-conical surface 12d. Extending substantially radially inwardly from surface 12d is at least one and preferably a plurality of longitudinally spaced, annular biting ribs 12e, each of which has an internal diameter comparable to or just slightly greater than the external diameter of the tube 20. The outer end of sleeve 12 terminates in a reduced thickness nose 12i.

Particular reference being had to Figure 3, the specific construction of the fitting elements will now be made clear. The fitting shown for illustrating the invention is arranged for use with a ⅝" O.D. tube, it being understood that similar fittings arranged for use with other size tubes are comprehended within the scope of the invention.

Frusto-conical surfaces 12b and 10e are so arranged that the inner end of sleeve 12 may be received somewhat within surface 10e thereby effecting a facial, or band sealing engagement between the surfaces. To provide a suitable wedging action for preventing rotation of sleeve 12 when nut 11 is rotatively advanced against sleeve surface 12e, while precluding radially outward expansion of the sleeve body inner end by the pressure of the sleeve against the body, the angle of inclination of frusto-conical surfaces 10e and 12b to their common axis is made no greater than 15 degrees and is preferably approximately 12 degrees. I have found that such an angle further effectively eliminates the need for any substantial longitudinal movement of the sleeve against surface 10e to effect the desired sealing engagement.

Bearing or camming surface 11c comprises a discontinuous frusto-conical surface having an inner frusto-conical portion 11d, a middle cylindrical portion 11e, and an outer frusto-conical portion 11f. I have found that by providing an inner bearing surface 11d with a relatively large angle of inclination to its axis an effectively minimized tendency to rotate sleeve 12 is produced, and this feature, together with the conjoint rotation prevention feature of surfaces 10e and 12b described above, effectively precludes rotation of sleeve 12 during assembly of the fitting. To this end, in the preferred embodiment, I make this angle approximately 22½ degrees. Still another advantages is obtained through the use of this preferred angle in that a suitable radial vectorial component of the force is produced acting against sleeve surface 12c effectively to force ribs 12e into tube 20, while sufficient longitudinal movement of nut 11 relative to sleeve 12 is allowed to dispose surface 11c to be substantially radially outwardly of ribs 12e for more properly effecting the rib constriction. The internal diameter of cylindrical surface 11e is preferably such that the dimension between it and the exterior of tube 20 is comparable to the radial thickness of sleeve nose 12i, thus assuring that ribs 12e will have substantially fully penetrated into tube 20 by the time nut 11 has been advanced to the position where nose 12i is radially within surface 11e. Further advancement of nut 11 beyond this point produces a considerable radial camming force tending to collapse tube 20 slightly, radially inwardly; I have found that a variation in the longitudinal extent of surface 11e, which is directly related to the diameter of the tubing, effects a proper degree of tube collapse. Thus, the longer surface 11e is made, the further nose 12i may be inserted therethrough (moved to the right as seen in Fig. 3) and the further up on surface 12c will the bearing of nut surface 11d be effected, thus the more forcibly will the sleeve outer end be pressed inwardly. Illustratively, I have found that in fittings adapted for use with 5/16" tubing, a length of .065" produces a desirable collapsing effect, and in fittings for use with tubes of ½" diameter and larger a length of .068" is satisfactory. To obtain quickly a positive "hit home" condition after nose 12i has been moved outwardly beyond surface 11e, the angle of outer surface 11f is made relatively large and is preferably comparable to the angle of inner surface 11d, namely 22½ degrees.

The action of bearing surfaces 11d, 11e, and 11f against nose 12i causes the nose to iron out and elongate somewhat as best seen in Figure 4.

The angle of frusto-conical surface 12c to its axis is preferably relatively small thereby permitting a suitable high radial pressure to be developed thereagainst by surface 11d during the assembly of the fitting. I have found that an angle of approximately 8 degrees is satisfactory for this purpose. Further, as this angle is smaller than the angle of nut surface 11d, engagement between surfaces 12c and 11d is restricted in area and improved assembly action results as the tendency of the sleeve to rotate is effectively minimized. Still further, however, this angle is such that the sleeve may be quickly constricted into sealing engagement with the tube.

The inclination of frusto-conical surface 12d to its axis is preferably relatively small to allow proper penetration of ribs 12e into tube 20 and facial engagement of surface 12d with the outer surface of the tube with only a small pivotal deformation of the outer end of sleeve 12. I have found that an angle of approximately 5 degrees is satisfactory for this purpose.

As indicated above at least one rib 12e is provided for sealingly securing tube 20 to sleeve 12. In the preferred embodiment three such ribs are provided, namely, longitudinally inner rib 12f having a frusto-conical longitudinally inner surface 12f' and a longitudinally outer frusto-conical surface 12f'', middle rib 12g having a longitudinally inner frusto-conical surface 12g' and a longitudinally outer frusto-conical surface 12g'', and longitudinally outer rib 12h having a longitudinally inner frusto-conical surface 12h' and a longitudinally outer frusto-conical surface 12h''. The juncture of the inner and outer frusto-conical surfaces in each of the ribs presents an acute included angle so that each of the ribs 12e constitutes a sharp, biting element. Further, by properly arranging each of the frusto-conical surfaces of ribs 12e relative to the pivotal deformation occuring in the outer end of sleeve 12 during assembly of the fitting, a substantially only radial constructive bite is produced, effectively precluding scraping and gouging of the tube surface and assuring a tight seal. To this end the inner frusto-conical surfaces are inclined only slightly to planes extending perpendicular to the axis of the sleeve, with the inclination increasing from the inner rib 12f to the outer rib. Illustratively, surface 12f' may be at an angle of 5 degrees to a plane perpendicular to the axis of the sleeve, surface 12g' may be at an angle of 10 degrees relative to a plane perpendicular to the axis, and surface 12h' may be at an angle of 20 degrees relative to a plane perpendicular to the axis. The outer frusto-conical surfaces of ribs 12e are preferably arranged to extend at substantial angles to planes perpendicular to the axis of the sleeve, the angle preferably being smallest in the longitudinally outer rib 12h. Illustratively, surface 12f'' and surface 12g'' may extend at an angle of approximately 50 degrees relative to planes perpendicular to the axis of the sleeve and surface 12h'' may extend at an angle of approximately 40 degrees relative to a plane perpendicular to the axis. To preclude undesired interference between ribs 12e in their biting action on tube 20, the ribs are preferably longitudinally spaced. In the preferred embodiment of the drawings, the spacing is such that the radially inner tips are equidistant one from the other at a distance of approximately .031". Outer rib 12h is preferably spaced longitudinally inwardly from the outer end of sleeve 12 at a distance approximately equal to twice the distance between the ribs, which in the illustrated embodiment is approximately .0625".

The structure of my fitting having been described, the functioning thereof in connecting a tube to an element will now be made clear. Body 10 is connected to the selected element (not shown) to have sealed, fluid conductive relationship therewith. Nut 11 is placed over the end of tube 20, outer bore portion 11b first. Sleeve 12 is then placed within nut bore portion 11a and over tube 20, nose 12i first. Tube 20 is arranged to extend axially of body bore 10a and to terminate preferably at a point just slightly longitudinally spaced from body 10. However, a considerable tolerance in the positioning of the termination of tube 20 is allowed as the longitudinal extent of sleeve 12 between flange 12a and surface 12d is substantial and a satisfactory sealed connection is obtained with a tube terminating anywhere therebetween.

Nut 11 is now threadedly advanced on body portion 10d and causes bearing surface 11c to bear with a substantially line contact against sleeve nose 12i and urge it to the left as seen in Figure 1. As sleeve 12 may slide readily over tube 20, the action of nut 11 on the sleeve at this time merely effects a slight longitudinal displacement of the sleeve to the end of forcing surface 12b into tight sealing engagement with body seating surface 10e. As this engagement effectively impedes longitudinally inward movement of sleeve 12, further advancement of nut 11 causes nut surface 11d effectively to climb up on sleeve surface 12c to have some surface engagement therewith and effect a radially inward constriction of the outer portion of sleeve 12. Ribs 12e are resultingly caused to bite or dig into the peripheral surface of tube 20 to connect sealingly the sleeve and the tube. As the wedge-like engagement between body seat 10e and sleeve surface 12b occurs before any substantial facial engagement is had between nut surface 11d and sleeve surface 12c, rotation of sleeve 12 is effectively prevented, precluding scoring of tube 20 by ribs 12e.

Upon advancement of nut 11 to the point where nose 12i is disposed radially inwardly of cylindrical surface 11e, the action of surface 11b is such as to effect compressional deformation of the sleeve between surface 12c and ribs 12e and cause concurrently some radially inward collapsing of tube 20 adjacent ribs 12e. This provides an intimate facial engagement between surface 12d and the outer surface of the tube and augments the sealing engagement of the ribs with the tube. In the final position rib inner surfaces 12f', 12g', and 12h' are arranged to extend, relative to the plane perpendicular to the sleeve axis, oppositely angularly to their extension in their original position as described above, whereby ribs 12e are effectively under-turned into tube 20 and positively lock tube 20 against longitudinal movement outwardly from sleeve 12 (to the right as seen in Figure 4). As the movement of ribs 12e is substantially only radial, however, no burrs or similar material pile-up are produced and a continuous sealing contact is had between sleeve 12 and tube 20 adjacent ribs 12e.

When nut 11 has been advanced to the point where nose 12i of sleeve 12 is substantially fully received in the space between surface 11f and tube 20, further advancement of the nut is effectively precluded and a definite "hit home" condition results wherein the operator may sense the completion of the fitting assembly by the resistance to advancement of the nut and discontinue the tightening thereof before excessive, fitting-deforming force is applied. Thus, the advancement of the nut is automatically stopped with bearing surface 11d disposed substantially radially outwardly of ribs 12e whereby most effective force transmission to sleeve 12 results.

A highly desirable feature of my fitting is that it is adapted for use with either hard or soft tubing. Thus, when tube 20 is formed of a relatively soft material, such as copper, the collapsing thereof occurs to a slightly greater extent during the assembly, and as nut surface 11d moves up on sleeve surface 12c to lie radially outwardly of front ribs 12f and 12g, these ribs provide the greater sealing retention. When tube 20 is comprised of a relatively hard material, such as steel, the tube collapse may be of less extent and because of the more limited advancement of nut 11, rear ribs 12g and 12h effect the greater sealing retention.

While I have shown and described certain embodiments of my invention, it is to be understood that it is capable of many modifications. Changes, therefore, in the construction and arrangement may be made without departing from the spirit and scope of the invention as disclosed in the appended claims.

I claim:

1. A metal fitting for use with a metallic tube comprising, in combination: a body having a bore therethrough and a recess in one end of the body concentric with the bore including an outwardly widening frusto-conical seating surface having a taper angle with respect to the axis of said body of substantially 12°; a nut having a stepped bore including a camming surface having a frusto-conical portion widening toward the body and having a taper angle with respect to the axis of said nut of substantially 22½°; threaded means on said body and said nut for urging said seating and camming surfaces toward one another as an incident of relative rotation of said nut and said body; and an annular sleeve having an inner end portion for effecting a fluid-tight seal with said body, an outer end portion for effecting a fluid-tight seal and an interlocking grip with a tube to be coupled, and a varied diameter bore including a cylindrical portion for the reception of a tube to be coupled, said sleeve at its inner end portion having a frusto-conical surface of the same angularity with respect to its axis as the seating surface of said body so as to have a conical band engagement therewith and of a diameter at its smaller end just slightly smaller than the maximum diameter of the seating surface in said body so as to enter the latter only slightly upon initial assembly of the fitting, said sleeve at its outer end portion having a frusto-conical radially outer surface, for cooperation with the camming surface of said nut, narrowing in a direction away from said body and having a taper angle of substantially 8° measured with respect to the axis of the sleeve, a frusto-conical radially inner surface enlarging progressively from the cylindrical portion of the bore outwardly to permit constriction of the outer end portion of said sleeve prior to engagement of the frusto-conical radially inner surface with the tube, and means projecting generally radially inwardly from said frusto-conical inner surface to become embedded in and positively grip the tube upon construction of the outer end portion of said sleeve.

2. A metal fitting for use with a metallic tube comprising, in combination: a body having a bore therethrough and a recess in one end of the body concentric with the bore including an outwardly widening frusto-conical seating surface having a taper angle with respect to the axis of said body of substantially 12°; a nut having a stepped bore including a camming surface having a frusto-conical portion widening toward the body and having a taper angle with respect to the axis of said nut of substantially 22½°; threaded means on said body and said nut for urging said seating and camming surfaces toward one another as an incident of relative rotation of said nut and said body; and an annular sleeve having an inner end portion for effecting a fluid-tight seal with said body, an outer end portion for effecting a fluid-tight seal and an interlocking grip with a tube to be coupled, and a bore including a first cylindrical portion at the inner end of said sleeve of a diameter intermediate the internal and external diameters of a tube to be coupled, an intermediate cylindrical portion of a diameter just large enough to receive the tube, and an outwardly diverging frusto-conical portion at the outer end portion of said sleeve, said sleeve at its inner end portion having a frusto-conical surface of the same angularity with respect to its axis as the seating surface of said body so as to have conical band engagement therewith and of a diameter at its smaller end just slightly smaller than the maximum diameter of the seating surface in said body so as, upon initial assembly of the fitting, to enter the recess in said body a distance less than the length of the first cylindrical portion of the bore in said sleeve, said sleeve at its outer end portion terminating in a blunt nose and having a single frusto-conical radially outer surface, for cooperation with the camming surface of said nut, narrowing uniformly in a direction away from said body and having a taper angle of substantially 8° measured with respect to the axis of the sleeve, and means projecting generally radially inwardly from said frusto-conical bore portion to become embedded in and positively grip the tube upon constriction of the outer end portion of said sleeve, said sleeve over the length of said first cylindrical bore portion having a radial thickness greater than the radial thickness of said sleeve at any point over the length of the frusto-conical bore portion to resist substantially to exclusion any constriction of the inner end portion of said sleeve upon assembly of the fitting and to facilitate constriction of the portion of said sleeve radially outwardly of the frusto-conical portion of the bore progressively increasing amounts taken in a direction longitudinally outward.

3. The fitting of claim 1, in which the means projecting generally radially inwardly from the frusto-conical portion of the bore of said sleeve comprises a plurality of annular, axially spaced teeth, each asymmetric with respect to a plane perpendicular to the axis of said sleeve and passing through the apex of the tooth with the inwardly facing surface of each tooth forming a larger angle with the axis of said sleeve than the outwardly facing surface, and with the inwardly facing surface of said teeth progressively approaching a right angle considered in a direction from the outwardmost tooth inwardly.

4. The fitting of claim 3, in which the outwardly facing surface of each tooth has an inclination with respect to the axis of said sleeve so that the angle included between the surfaces of a tooth does not substantially exceed 60°.

5. The fitting of claim 2, in which the camming surface of said nut is a compound surface including a frusto-conical portion having a taper angle with respect to the axis of said nut of substantially 22½° and a cylindrical portion outwardly of the frusto-conical portion and with the space defined by the cylindrical portion being entered by said sleeve only after predetermined assembly of the fitting.

6. The fitting of claim 5, in which the camming surface of said nut is a compound surface comprising two frusto-conical portions each having a taper angle with respect to the axis of the nut of substantially 22½° and a cylindrical portion intermediate the frusto-conical portions.

7. The fitting of claim 5, in which the cylindrical portion of the camming surface has a diameter such that the space between it and the outer surface of the tube is substantially equal to the radial thickness of the outer end of said sleeve.

References Cited in the file of this patent

UNITED STATES PATENTS

| | | |
|---|---|---|
| 2,233,214 | Lamont | Feb. 25, 1941 |
| 2,452,890 | Wolfram | Nov. 2, 1948 |
| 2,464,416 | Raybould | Mar. 15, 1949 |
| 2,613,959 | Richardson | Oct. 14, 1952 |
| 2,640,716 | Bigelow | June 2, 1953 |
| 2,641,487 | La Marre | June 9, 1953 |
| 2,693,374 | Wurzburger | Nov. 2, 1954 |
| 2,693,377 | Wurzburger | Nov. 2, 1954 |
| 2,695,796 | Woodling | Nov. 30, 1954 |
| 2,823,935 | Wurzburger | Feb. 18, 1958 |